(12) United States Patent
Sishtla

(10) Patent No.: US 9,657,747 B2
(45) Date of Patent: May 23, 2017

(54) MOTOR ROTOR AND AIR GAP COOLING

(71) Applicant: Carrier Corporation, Farmington, CT (US)

(72) Inventor: Vishnu M. Sishtla, East Syracuse, NY (US)

(73) Assignee: CARRIER CORPORATION, Farmington, CT (US)

( * ) Notice: Subject to any disclaimer, the term of this patent is extended or adjusted under 35 U.S.C. 154(b) by 230 days.

(21) Appl. No.: 14/425,480

(22) PCT Filed: Jul. 2, 2013

(86) PCT No.: PCT/US2013/049016
§ 371 (c)(1),
(2) Date: Mar. 3, 2015

(87) PCT Pub. No.: WO2014/039155
PCT Pub. Date: Mar. 13, 2014

(65) Prior Publication Data
US 2015/0204350 A1 Jul. 23, 2015

Related U.S. Application Data
(60) Provisional application No. 61/697,354, filed on Sep. 6, 2012.

(51) Int. Cl.
*H02K 9/00* (2006.01)
*F04D 29/58* (2006.01)
(Continued)

(52) U.S. Cl.
CPC ......... *F04D 29/5806* (2013.01); *F04D 29/26* (2013.01); *H02K 1/32* (2013.01); *H02K 9/19* (2013.01); *H02K 9/193* (2013.01)

(58) Field of Classification Search
CPC ........ H02K 9/19; H02K 1/32; F04D 29/5806; F04D 29/26
(Continued)

(56) References Cited

U.S. PATENT DOCUMENTS 4,301,386 A * 11/1981 Schweder ................ H02K 1/32
310/211
5,221,191 A 6/1993 Leyderman et al.
(Continued)

FOREIGN PATENT DOCUMENTS

| GB | 2012118 A | 7/1979 |
|---|---|---|
| WO | 2011073520 A2 | 6/2011 |

OTHER PUBLICATIONS

Notification of Transmittal of the International Search Report and the Written Opinion of the International Searching Authority for PCT/US2013/049016; Mailing date Nov. 17, 2014.
(Continued)

*Primary Examiner* — Hanh Nguyen
(74) *Attorney, Agent, or Firm* — Cantor Colburn LLP

(57) ABSTRACT

A motor cooling system for a simply supported compressor includes a rotor shaft 24 having a first end 26 and a second end 28. The rotor shaft 24 includes an axial bore 60 and a plurality of shaft radial holes 64 extending from a first end of the axial bore 60, wherein a cooling medium is supplied to the axial bore 60. The cooling system further includes a rotor 22 coupled to the rotor shaft 24 and having a plurality of rotor axial holes 25 and a plurality of rotor radial holes 27. The plurality of rotor radial holes 27 extends from the plurality of rotor axial holes 25. A refrigerant dam 70 is arranged adjacent a first end of the rotor 22 and includes a plurality of dam axial holes 74 fluidly coupled to an interior cavity 72. The dam axial holes 74 align with the rotor axial holes 25 and the interior cavity 72 aligns with the shaft radial
(Continued)

holes 64 to form a flow path between the rotor shaft 24 and the rotor 22.

15 Claims, 5 Drawing Sheets

(51) Int. Cl.
- *H02K 9/19* (2006.01)
- *H02K 1/32* (2006.01)
- *H02K 9/193* (2006.01)
- *F04D 29/26* (2006.01)

(58) Field of Classification Search
USPC .............. 310/52, 54, 58, 64, 60 R, 61, 60 A
See application file for complete search history.

(56) References Cited

U.S. PATENT DOCUMENTS

| | | | |
|---|---|---|---|
| 5,222,874 A | 6/1993 | Unnewehr et al. | |
| 5,519,269 A | 5/1996 | Lindberg | |
| 5,659,205 A | 8/1997 | Weisser | |
| 5,760,508 A | 6/1998 | Jennings et al. | |
| 5,813,372 A | 9/1998 | Manthey | |
| 6,515,384 B1 | 2/2003 | Kikuchi et al. | |
| 6,727,609 B2 | 4/2004 | Johnsen | |
| 6,812,427 B2 | 11/2004 | Sgrignuoli | |
| 6,847,140 B2 | 1/2005 | Kimberlin et al. | |
| 6,903,471 B2 | 6/2005 | Arimitsu et al. | |
| 6,909,210 B1 | 6/2005 | Bostwick | |
| 6,982,506 B1 | 1/2006 | Johnsen | |
| 7,002,267 B2 | 2/2006 | Raszkowski et al. | |
| 7,061,148 B2 | 6/2006 | Philippart | |
| 7,102,267 B2 | 9/2006 | Gromoll et al. | |
| 7,129,602 B2 | 10/2006 | Lange et al. | |
| 7,193,342 B2 | 3/2007 | Casey et al. | |
| 7,208,854 B1 | 4/2007 | Saban et al. | |
| 7,242,119 B2 | 7/2007 | Gomes De Lima | |
| 7,315,099 B2 | 1/2008 | Steffen et al. | |
| 7,362,016 B2 | 4/2008 | Cheng | |
| 7,394,175 B2 | 7/2008 | McAuliffe et al. | |
| 7,397,154 B2 | 7/2008 | Tilton et al. | |
| 7,402,923 B2 | 7/2008 | Klemen et al. | |
| 7,411,323 B2 | 8/2008 | Pfannschmidt et al. | |
| 7,476,994 B2 | 1/2009 | Birdi et al. | |
| 7,489,057 B2 | 2/2009 | Zhou et al. | |
| 7,508,100 B2 | 3/2009 | Foster | |
| 7,514,827 B2 | 4/2009 | Hall | |
| 7,520,965 B2 | 4/2009 | Wei | |
| 7,528,510 B2 | 5/2009 | Frank et al. | |
| 7,538,457 B2 | 5/2009 | Holmes et al. | |
| 7,598,635 B2 | 10/2009 | Howard et al. | |
| 7,633,193 B2 | 12/2009 | Masoudipour et al. | |
| 7,667,358 B2 | 2/2010 | Okazaki et al. | |
| 7,704,056 B2 | 4/2010 | Masoudipour et al. | |
| 7,705,495 B2 | 4/2010 | Alfermann et al. | |
| 7,737,584 B2 | 6/2010 | Muller et al. | |
| 7,786,630 B2 | 8/2010 | Waddell et al. | |
| 7,791,238 B2 | 9/2010 | Pal et al. | |
| 7,863,787 B2 | 1/2011 | Lafontaine et al. | |
| 7,946,118 B2 | 5/2011 | Hippen et al. | |
| 7,948,125 B2 | 5/2011 | Woody et al. | |
| 7,952,240 B2 | 5/2011 | Takenaka et al. | |
| 8,013,482 B2 | 9/2011 | Kurokawa | |
| 8,022,593 B2 | 9/2011 | Lamperth et al. | |
| 8,030,810 B2 | 10/2011 | Favaretto | |
| 8,080,908 B2 | 12/2011 | Matsubara et al. | |
| 8,129,874 B2 | 3/2012 | Lambka et al. | |
| 8,138,642 B2 | 3/2012 | Lemmers, Jr. et al. | |
| 8,203,241 B2 | 6/2012 | Tanaka | |
| 8,760,014 B2 * | 6/2014 | Birdi .................. | H02K 1/32 310/54 |
| 2003/0030333 A1 * | 2/2003 | Johnsen ................ | H02K 1/32 310/54 |
| 2003/0094007 A1 | 5/2003 | Choi et al. | |
| 2008/0024020 A1 * | 1/2008 | Iund ..................... | H02K 5/20 310/61 |
| 2009/0229280 A1 | 9/2009 | Doty et al. | |
| 2010/0181873 A1 | 7/2010 | Kern et al. | |
| 2010/0194220 A1 * | 8/2010 | Tatematsu ............ | H02K 1/2766 310/61 |
| 2011/0074233 A1 | 3/2011 | Okada et al. | |
| 2011/0148229 A1 | 6/2011 | Esse | |
| 2011/0298319 A1 | 12/2011 | Chamberlin et al. | |
| 2011/0309697 A1 | 12/2011 | Kirkley, Jr. et al. | |
| 2012/0001504 A1 | 1/2012 | Erfanfar et al. | |
| 2012/0007455 A1 * | 1/2012 | Tanaka .................. | F04B 35/04 310/66 |
| 2012/0013206 A1 | 1/2012 | Meyer | |
| 2012/0104884 A1 | 5/2012 | Wagner et al. | |
| 2012/0189472 A1 | 7/2012 | McDonald | |
| 2012/0194012 A1 | 8/2012 | Chamberlin et al. | |
| 2012/0220379 A1 | 8/2012 | Murakami | |

OTHER PUBLICATIONS

Chinese Office Action and Search Report with Translation for Appl. No. 2013800465854; Issue Date: Nov. 23, 2016; 11 pages.

* cited by examiner

MOTOR ROTOR AND AIR GAP COOLING

BACKGROUND OF THE INVENTION

The invention relates generally to compression refrigeration systems and, more particularly, to compression refrigeration systems having improved motor cooling.

In a compression system, a motor is provided for driving a compressor mechanism. The size and type of the motor required depends upon several factors, including the capacity of the compressor and the operating environment of the compression system. Providing adequate motor cooling without sacrificing energy efficiency of the compression system remains challenging, especially in large-capacity systems. Centrifugal compressors are often used in refrigeration systems. Centrifugal compressors are usually driven by electric motors that are commonly included in a housing that encases both the motor and the compressor. The motor must therefore be cooled using a cooling medium, such as the refrigerant from the main refrigerant cycle for example.

In known motor cooling methods, liquid refrigerant is sourced from the high-pressure line between the condenser and the expansion device. The refrigerant is injected into the motor housing where it absorbs motor heat and rapidly evaporates or flashes into gaseous form, thus cooling the motor. Conventional motor assemblies include an overhung motor arrangement, where an unsupported end of the rotor is easily accessible within the housing. In such systems, the liquid refrigerant is sprayed into the unsupported end of the motor. The refrigerant travels through axial and radial holes cooling the rotor until reaching the air gap between the rotor and the stator. New compressor motor assemblies, however, may include a rotor shaft that is simply supported at both ends. Because the rotor is no longer easily accessible at one end, the liquid refrigerant cannot be sprayed into the core of the rotor.

BRIEF DESCRIPTION OF THE INVENTION

According to an aspect of the invention, a motor cooling system for a simply supported compressor is provided including a rotor shaft having a first end and a second end. The rotor shaft includes an axial bore and a plurality of shaft radial holes extending from a first end of the axial bore. A cooling medium is supplied to the axial bore. The cooling system also includes a rotor having a plurality of rotor axial holes and a plurality of rotor radial holes. The plurality of rotor radial holes extends from the plurality of rotor axial holes. The rotor is coupled to the rotor shaft. A refrigerant dam is arranged adjacent a first end of the rotor. The refrigerant dam includes a plurality of dam axial holes fluidly coupled to an interior cavity. The plurality of damn axial holes aligns with the plurality of rotor axial holes and the interior cavity aligns with the plurality of shaft radial holes to form a flow path between the rotor shaft and the rotor.

According to yet another aspect of the invention, a motor cooling system for a simply supported compressor system is provided including a rotor having a plurality of rotor axial holes and a plurality of rotor radial holes. The plurality of rotor radial holes extend from the plurality of rotor axial holes and the rotor is mounted to a rotor shaft. A refrigerant dam is arranged adjacent a first end of the rotor. The refrigerant dam includes a plurality of dam axial holes fluidly coupled to an interior cavity. The plurality of dam axial holes are aligned with the plurality of rotor axial holes. The motor cooling system also includes a spray bar having an elongated chute mounted adjacent a motor casing. A cooling medium is supplied to the spray bar. The elongated chute is arranged at an angle such that a free end of the elongated chute is adjacent an interface between the refrigerant dam and the rotor shaft.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
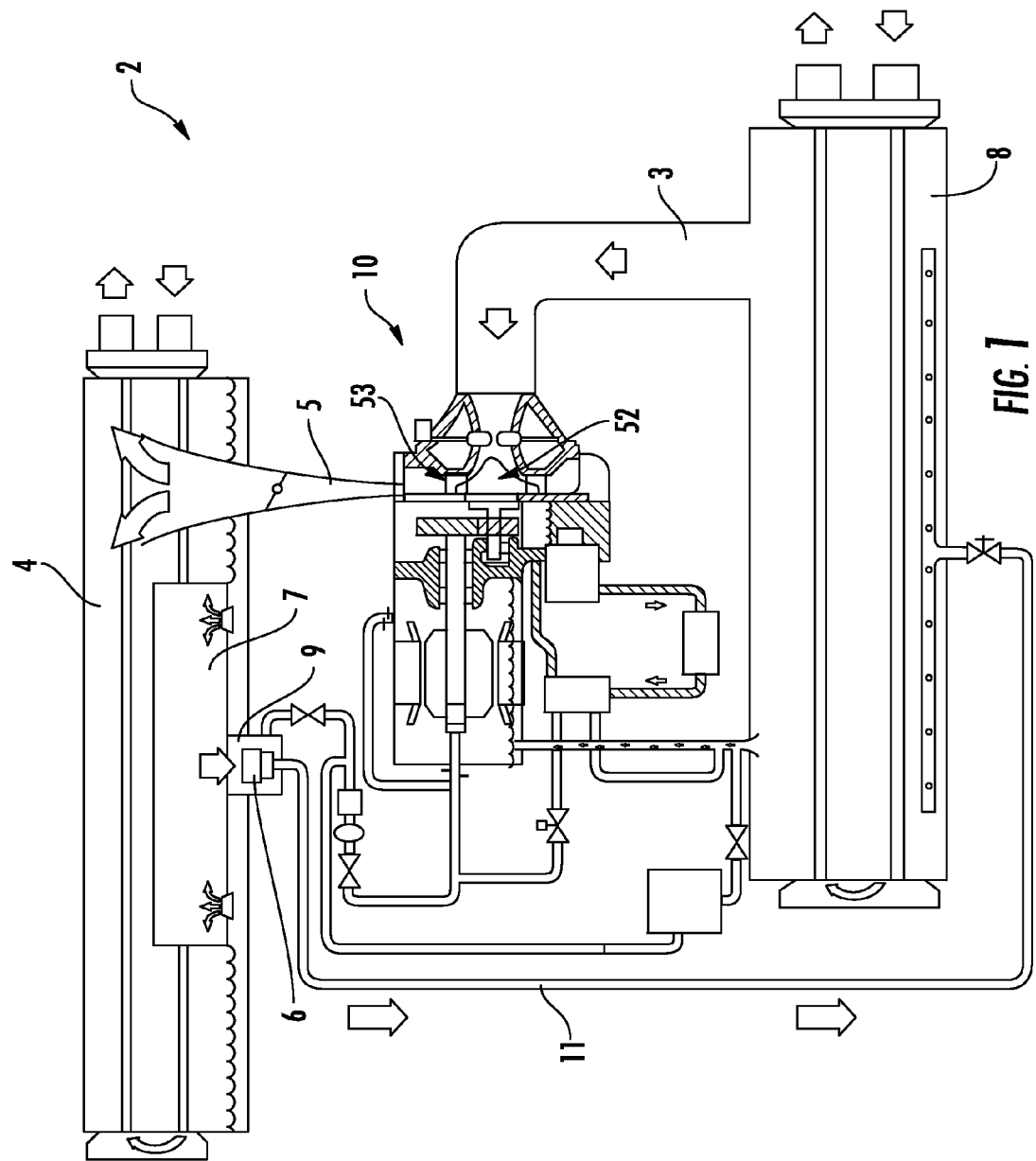
FIG. 1 is a cross-sectional view of an exemplary chiller refrigeration system.

Referring now to FIG. 1, the illustrated chiller refrigeration system 2 includes a compressor 10, a condenser 4, and a cooler or evaporator 8 fluidly coupled to form a circuit. A first conduit 3 extends from adjacent the outlet of the cooler 8 to the inlet of the compressor 10. The outlet of the compressor 10 is coupled by a conduit 5 to an inlet of the condenser 4. In one embodiment, the condenser 4 may include a first chamber 7, and a second chamber 9 accessible only from the interior of the first chamber 7. A float valve 6 within the second chamber 9 is connected to an inlet of the cooler by another conduit 11. Depending on the size of the chiller system, the compressor 10 may be a rotary, screw, or reciprocating compressor for small systems, or a screw compressor or centrifugal compressor for larger systems. A typical centrifugal compressor 10 includes an impeller 52 for accelerating the refrigerant vapor to a high velocity, a diffuser 53 for decelerating the refrigerant to a low velocity while converting kinetic energy to pressure energy, and a discharge plenum in the form of a volute or collector (not shown) to collect the discharge vapor for subsequent flow to the condenser 4.

Figure 2:
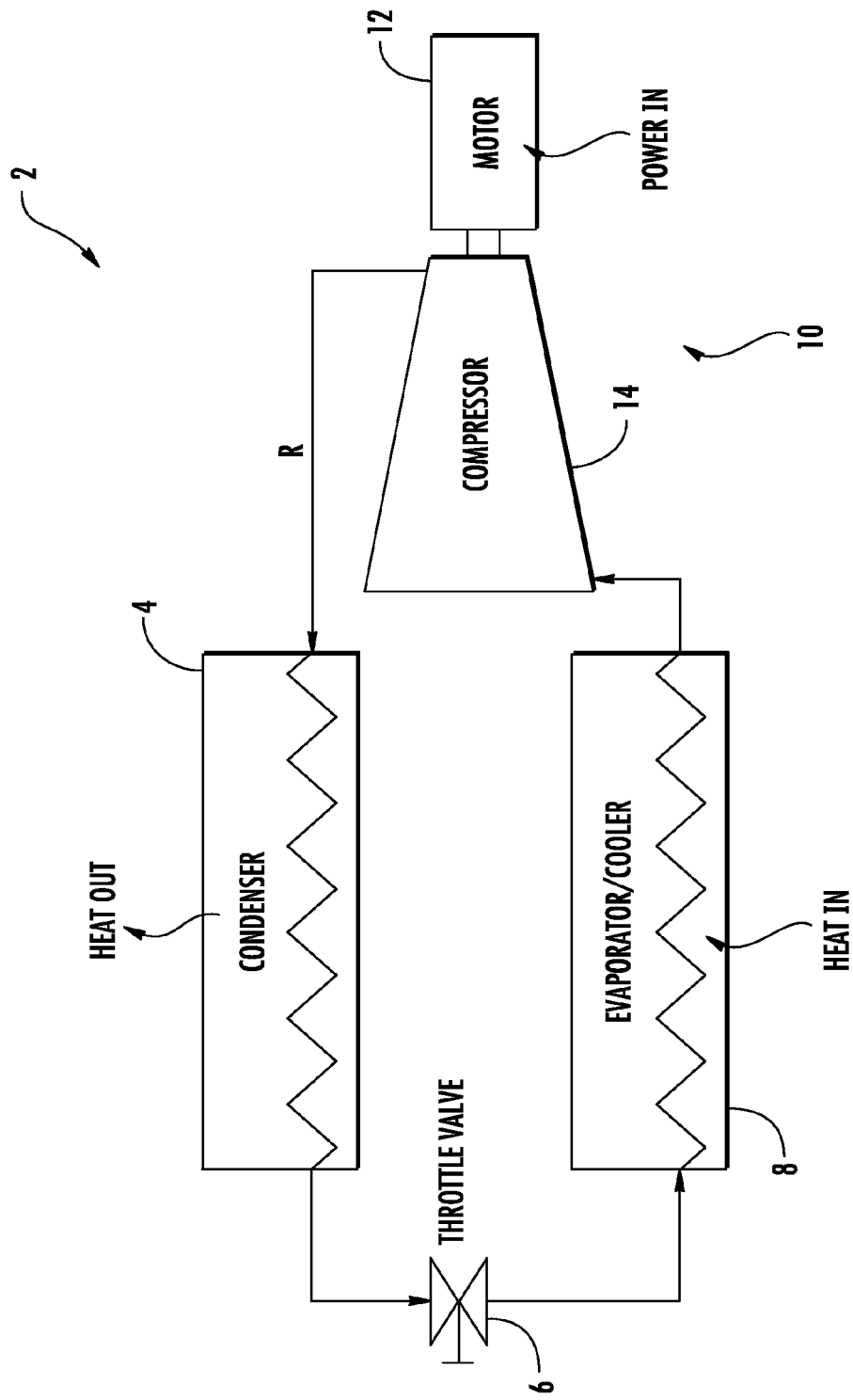
FIG. 2 is a schematic illustration of the vapor compression cycle of the chiller refrigeration system illustrated in FIG. 1.

FIG. 2 represents a typical vapor compression cycle of the chiller 2 illustrated in FIG. 1. Within this cycle, a refrigerant R flows in a counterclockwise direction as indicated by the arrows. The compressor 10 receives refrigerant vapor from the evaporator/cooler 8 and compresses it to a higher temperature and pressure, with the relatively hot vapor then passing to the condenser 4 where it is cooled and condensed to a liquid state by a heat exchange relationship with a cooling medium such as air or water. The liquid refrigerant R then passes from the condenser 4 to a throttle, such as float valve 6 for example, wherein the refrigerant R is expanded to a low temperature two phase liquid/vapor state as it passes to the evaporator/cooler 8. The low pressure vapor then passes to the compressor 10 where the cycle is again commenced.

Figure 3:
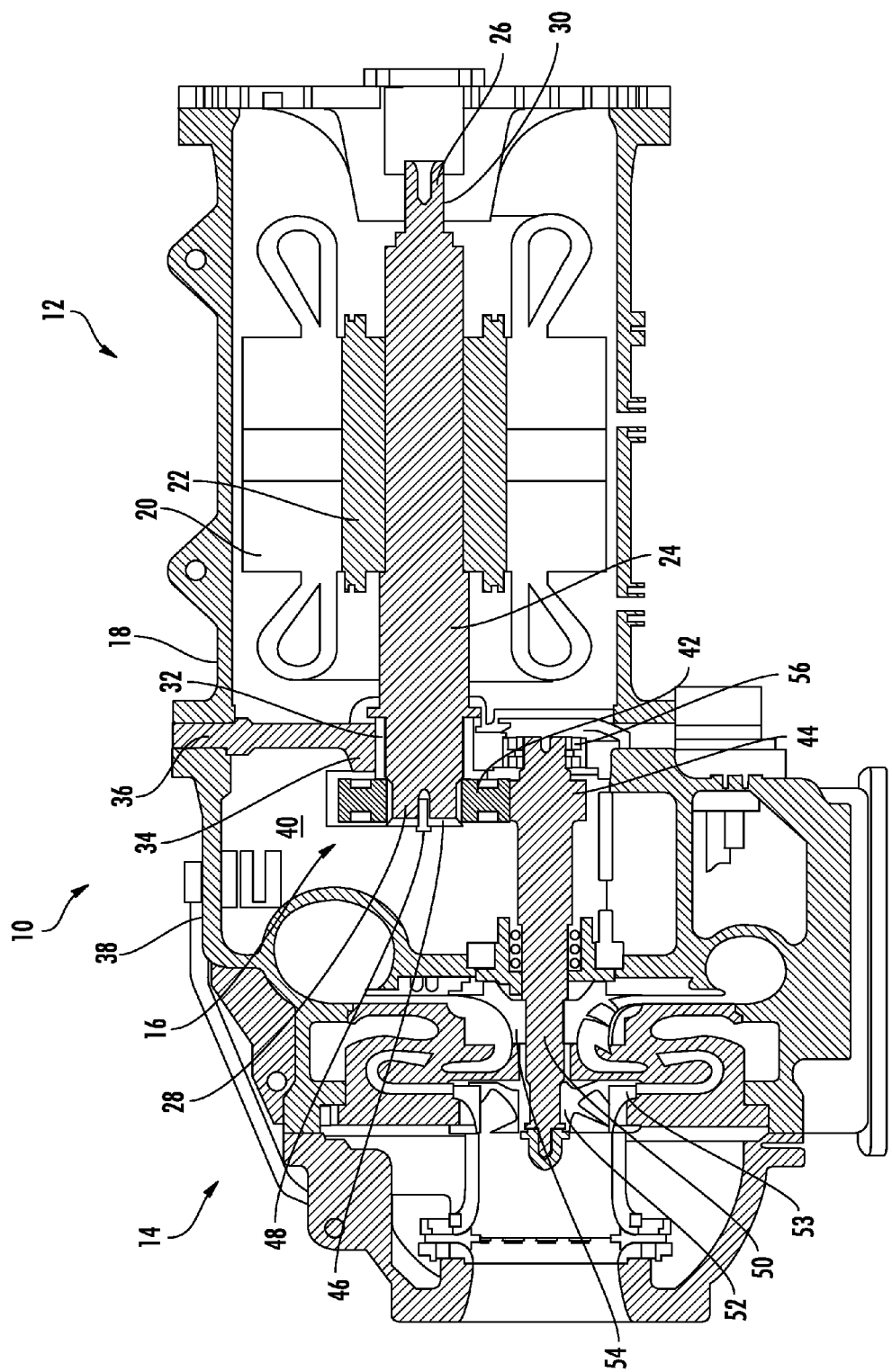
FIG. 3 is a longitudinal cross-section of an centrifugal compressor according to an embodiment of the invention.

Referring now to FIG. 3, an exemplary centrifugal compressor system 10 of the chiller 2 is provided in more detail. The centrifugal compressor system 10 includes a motor 12 at one end and a centrifugal compressor 14 at a second, opposite end, with the two being interconnected by a transmission assembly 16. The motor 12 includes a motor casing 18 with a stator coil 20 disposed around its inner circumference. The rotor 22 is then rotatably disposed within the stator winding 20 by way of a rotor shaft 24 supported by a first bearing 30 at a first end 26 and a second bearing 32 at a second end 28. The transmission assembly 16, connected to the second end 28 of the rotor shaft 24 includes a transmission casing 34 having a radially extending annular flange 36 that is secured between the motor casing 18 and a compressor casing 38 by a plurality of bolts (not shown), with the transmission casing 34 and the compressor casing 38 partially defining a transmission chamber 40.

A thrust collar (not shown), formed in part by gear 42, may be provided to transmit the thrust forces from the second end 28 of the rotor shaft 24 to the thrust bearing portion of the second bearing 32. The second end 28 of the rotor shaft 24 extends beyond the transmission casing 34 where a drive gear 42 is attached thereto by way of a retaining plate 46 and a bolt 48. The drive gear 42 engages a driven gear 44 that in turn drives an impeller shaft 50 for directly driving a compressor impeller 52. The impeller shaft 50 is supported by impeller bearings 54, 56.

Figure 4:
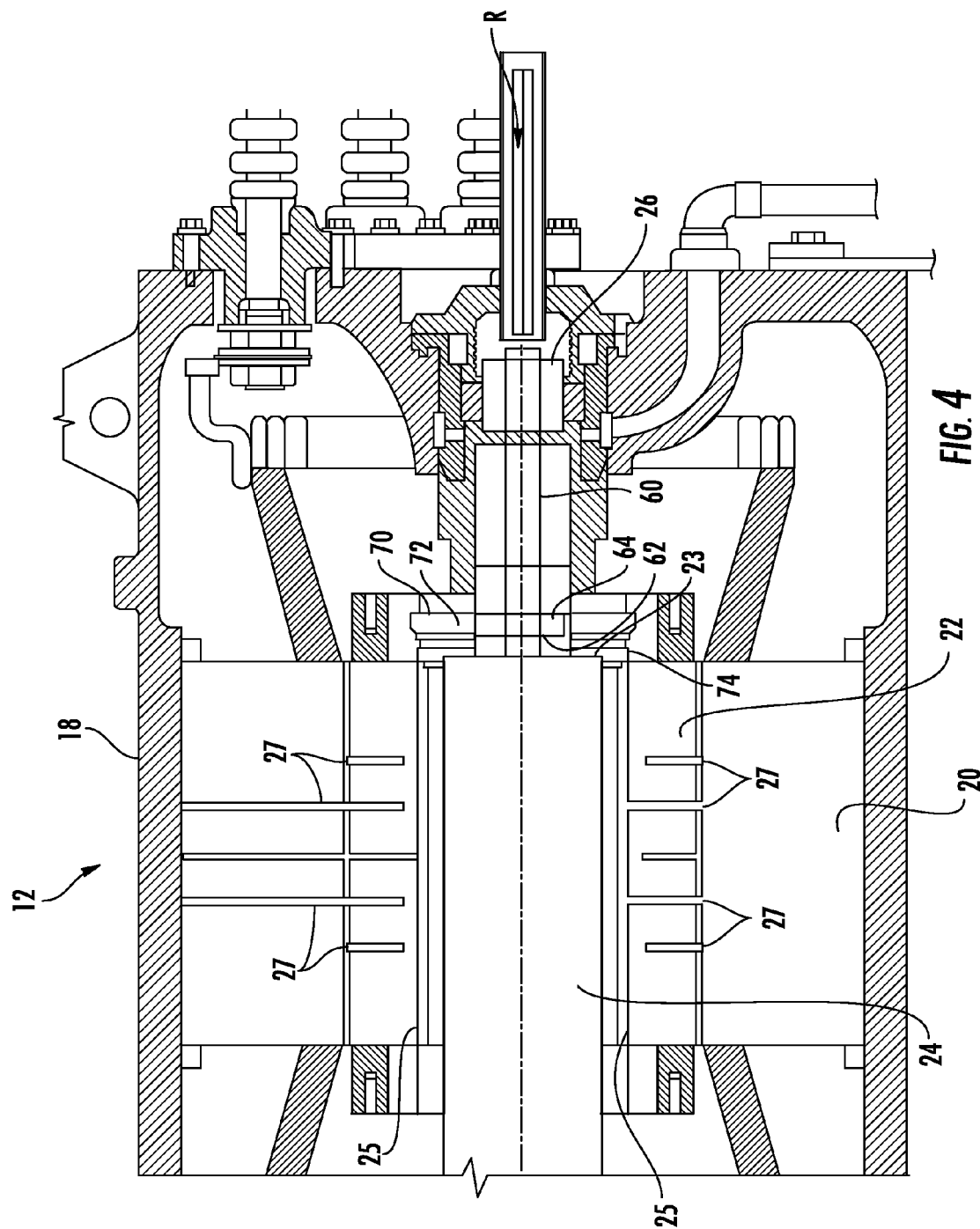
FIG. 4 is a detailed view of refrigerant flow path according to an embodiment of the invention.

To prevent the motor 12 from overheating, liquid refrigerant R is diverted from the condenser 4 and is used to cool the rotor 22 of the motor 12. In one embodiment, illustrated in FIG. 4, a portion of the rotor shaft 24 includes an axial bore 60 such that the liquid refrigerant R flows through the axial bore 60. The axial bore 60 may extend from the first end 26 of the rotor shaft 24 to the portion of the shaft 24 near the first end 23 of the rotor 22. Adjacent the first end 23 of the rotor 22 is a refrigerant dam 70 having an interior cavity 72 adjacent the rotor shaft 24 and a plurality of axial holes 74 (best shown in FIG. 5). In one embodiment, the refrigerant dam 70 may be coupled with the first end 23 of the rotor 22. Similarly, the rotor 22 includes a plurality of axial holes 25 disposed adjacent the rotor shaft 24 as well as a plurality of radial holes 27 that extend from those axial holes 25. The axial holes 25 span at least a portion of the length of the rotor 22. In one embodiment, the axial holes 25 extend along the full length of the rotor 22 to maximum the cooling. The interior cavity 72 of the refrigerant dam 70 aligns with at least one radial hole 64 extending outwardly from the inside end 62 of the axial bore 60 and the axial holes 74 of the refrigerant dam 70 align with the axial holes 25 of the rotor 22. By aligning the holes of adjacent components, a path for the liquid refrigerant is created such that the refrigerant R flows into the axial bore 60 in the rotor shaft 24, through the refrigerant dam 70 and into the rotor 22. Once within the rotor 22, the refrigerant R will travel both laterally and radially to cool the core of the rotor 22.

Figure 5:
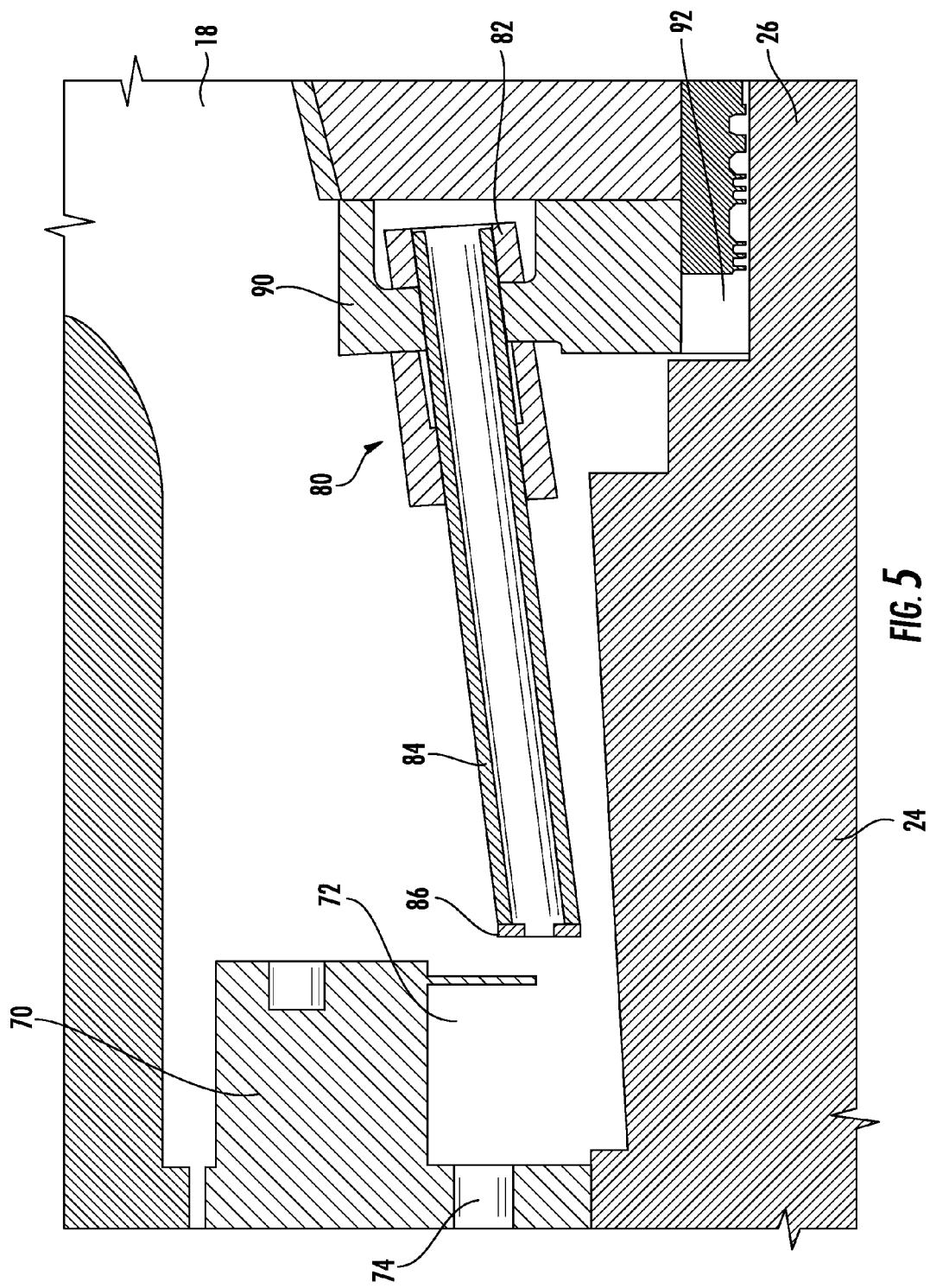
FIG. 5 is a detailed view of another refrigerant flow path according to an embodiment of the invention.

In another embodiment, illustrated in FIG. 5, a spray bar 80 including an elongated chute 84 is positioned near the motor casing 18 to form a liquid refrigerant R flow path. The motor casing 18 includes an opening (not shown) sized to allow a sufficient volume of refrigerant R to flow from the condenser 4 to the spray bar 80. The spray bar 80 may be mounted directly to the motor casing 18, or alternatively, may be coupled to a spacer 90 at a first end 82. In embodiments including a spacer 90, a seal 92, such as a labyrinth seal for example, is disposed between the spacer 90 and a portion of the rotor shaft 24 to minimize the mixing of the liquid refrigerant R with the oil of the compressor system 10. The elongated chute 84 of the spray bar 80 extends at an angle in the direction away from the spacer 90 or motor casing 18 and towards the rotor 22. In one embodiment, the unattached end 86 of the chute 84 is located adjacent the interface between the rotor shaft 24 and the refrigeration dam 70. Angling the chute towards the opening into the interior cavity 72 of the refrigerant dam 70 facilitates the flow of liquid refrigerant into the dam 70. The refrigerant R within the interior cavity 72 flows through the at least one axial hole 74 of the refrigerant dam 70 into the aligned axial holes 25 of the rotor 22. Once within the rotor 22, the refrigerant R will travel both laterally and radially to cool the core of the rotor 22.

The embodiments described herein provide adequate liquid refrigerant to cool the motor without compromising the size or weight of the rotor. This flow of liquid refrigerant may access hard to reach areas, thereby establishing a direct contact heat exchange. Such direct contact heat exchange has been found to be a highly desirable method of cooling the motor in general, and particularly the rotor assembly and motor gap areas of the motor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A motor cooling system for a simply supported compressor system comprising:
   a rotor shaft having a first end and a second end, the rotor shaft including an axial bore and a plurality of shaft radial holes extending from a first end of the axial bore, wherein a cooling medium is supplied to the axial bore;
   a rotor including a plurality of rotor axial holes and a plurality of rotor radial holes extending from the plurality of rotor axial holes, wherein the rotor is coupled to the rotor shaft; and
   a refrigerant dam arranged adjacent a first end of the rotor, the refrigerant dam including a plurality of dam axial holes fluidly coupled to an interior cavity, wherein the plurality of dam axial holes are aligned with the plurality of rotor axial holes, and the interior cavity is aligned with the plurality of shaft radial holes such that a flow path is formed between the rotor shaft and the rotor.

2. The motor cooling system according to claim 1, wherein the first end of the rotor shaft is supported by a first bearing and the second end of the rotor shaft is supported by a second bearing.

3. The motor cooling system according to claim 1, wherein the cooling medium is supplied to the axial bore from a conduit connecting a condenser and a cooler.

4. The motor cooling system according to claim 1, wherein the axial bore extends from a first end of the rotor shaft to adjacent the first end of the rotor.

5. The motor cooling system according to claim 1, wherein the plurality of rotor axial holes extend over a portion of a length of the rotor.

6. The motor cooling system according to claim 1, wherein the plurality of rotor axial holes extend over an entire length of the rotor.

7. A motor cooling system for a simply supported compressor system comprising:
- a rotor including a plurality of rotor axial holes and a plurality of rotor radial holes extending form the plurality of rotor axial holes, the rotor being mounted to a rotor shaft having a first end and a second end;
- a refrigerant dam arranged adjacent a first end of the rotor, the refrigerant dam including a plurality of dam axial holes fluidly coupled to an interior cavity, wherein the plurality of dam axial holes are aligned with the plurality of rotor axial holes; and
- a spray bar including an elongated chute mounted adjacent a motor casing, wherein a cooling medium is supplied to the spray bar, and the elongated chute is arranged at an angle such that a free end of the elongated chute is adjacent an interface between the refrigerant dam and the rotor shaft.

8. The motor cooling system according to claim 7, wherein the first end of the rotor shaft is supported by a first bearing and the second end of the rotor shaft is supported by a second bearing.

9. The motor cooling system according to claim 7, wherein the cooling medium is supplied to the axial bore from a conduit connecting a condenser and a cooler.

10. The motor cooling system according to claim 7, further comprising a spacer, wherein the spacer is disposed between the spray bar and the motor casing.

11. The motor cooling system according to claim 10, wherein a labyrinth seal is positioned between the spacer and the first end of the rotor shaft.

12. The motor cooling system according to claim 7, wherein the interface between the refrigerant dam and the rotor shaft includes an opening of the interior cavity.

13. The motor cooling system according to claim 7, wherein the refrigerant dam is formed integrally with the first end of the rotor.

14. The motor cooling system according to claim 7, wherein the plurality of rotor axial holes extend over a portion of a length of the rotor.

15. The motor cooling system according to claim 7, wherein the plurality of rotor axial holes extend over an entire length of the rotor.

\* \* \* \* \*